United States Patent
Giboli et al.

(10) Patent No.: US 10,557,956 B2
(45) Date of Patent: Feb. 11, 2020

(54) METHOD AND SYSTEM OF PROCESSING SEISMIC DATA BY PROVIDING SURFACE APERTURE COMMON IMAGE GATHERS

(71) Applicant: TOTAL SA, Courbevoie (FR)

(72) Inventors: Matteo Giboli, Pau (FR); Cyril Agut, Pau (FR); Reda Baina, Pau (FR)

(73) Assignee: TOTAL SA, Courbevoie (FR)

( * ) Notice: Subject to any disclaimer, the term of this patent is extended or adjusted under 35 U.S.C. 154(b) by 191 days.

(21) Appl. No.: 15/562,819

(22) PCT Filed: Mar. 31, 2016

(86) PCT No.: PCT/EP2016/057136
§ 371 (c)(1),
(2) Date: Sep. 28, 2017

(87) PCT Pub. No.: WO2016/156530
PCT Pub. Date: Oct. 6, 2016

(65) Prior Publication Data
US 2018/0106919 A1  Apr. 19, 2018

(30) Foreign Application Priority Data
Mar. 31, 2015 (EP) ..................... 15305472

(51) Int. Cl.
*G01V 1/32* (2006.01)
*G01V 1/00* (2006.01)

(52) U.S. Cl.
CPC .............. *G01V 1/325* (2013.01); *G01V 1/008* (2013.01); *G01V 2210/512* (2013.01); *G01V 2210/53* (2013.01); *G01V 2210/59* (2013.01)

(58) Field of Classification Search
CPC .... G01V 1/325; G01V 1/008; G01V 2210/53; G01V 2210/59; G01V 2210/512
See application file for complete search history.

(56) References Cited

U.S. PATENT DOCUMENTS

| 9,632,192 | B2 * | 4/2017 | Baina | ............... G01V 1/282 |
| 9,726,771 | B1 * | 8/2017 | Popovici | ............... G01V 1/345 |
| 2013/0242699 | A1 * | 9/2013 | Lambare | ............... G01V 1/303 367/53 |

* cited by examiner

*Primary Examiner* — Elias Desta
(74) *Attorney, Agent, or Firm* — Patterson Thuente Pedersen, P.A.

(57) ABSTRACT

The method processes, for each of a plurality of shots at respective source locations, seismic traces recorded at a plurality of receiver locations. Common-mid-point-modulated data are also computed by multiplying the seismic data in each seismic trace by a horizontal mid-point. A depth migration process is applied to the seismic data to obtain a first set of migrated data, and to the mid-point-modulated data to obtain a second set of migrated data. For each shot, aperture values are estimated and associated with respective subsurface positions. A migrated value for a depth and an aperture in a surface aperture common image gather at a horizontal position is a migrated value of the first set of migrated data for a shot such that the estimated aperture value associated with that subsurface position is the aperture.

6 Claims, 3 Drawing Sheets

METHOD AND SYSTEM OF PROCESSING SEISMIC DATA BY PROVIDING SURFACE APERTURE COMMON IMAGE GATHERS

RELATED APPLICATIONS

The present application is a National Phase entry of PCT Application No. PCT/EP2016/057136, filed Mar. 31, 2016, which claims priority from EP Patent Application No. 15305472.1, filed Mar. 31, 2015, said applications being hereby incorporated by reference herein in their entirety.

FIELD OF THE INVENTION

The present invention relates to methods of processing seismic data. It is applicable in the field of geophysical prospecting when images of the subsurface are needed.

BACKGROUND OF THE INVENTION

To obtain images of the subsurface, a seismic method is often used, which consists in creating and sending seismic waves in the ground using sources such as explosives or vibrator trucks on land, or airguns offshore. The seismic waves penetrate the ground and get bounced, or reflected off geological discontinuities in the subsurface. As a result, they come back to the surface, where they are recorded using arrays of three component geophones (on land), or hydrophones (offshore) which are regularly distributed to cover areas of several square kilometers.

Recent advances in seismic acquisition techniques have considerably improved the illumination of the subsurface. This capability to better compensate for uneven illumination represents a boon for production of new images of the subsurface. Seismic acquisitions are typically designed to be strongly redundant, in order to improve the signal to noise ratio; however, more data potentially means more diversity in the quality across different partitioned data. Wide azimuth acquisition may yield localized data areas that are "poor" in quality for certain azimuths, and will penalize the "good" data yielded in those locations on other azimuth cubes when processed into the final stack Additionally, the inadequacy of the physics we use at various stages of the seismic processing workflow does not allow to fully benefit from all the new available measurements. Inaccuracy of the velocity models produces errors in the computed travel-times and these lead to inconsistencies in the positioning of seismic events in different pre-stack images; if not properly aligned before summation they can interfere destructively yielding to a defocused migrated image. Advancement in velocity estimation techniques will certainly lead to more adequate subsurface models over time, but a certain amount of inaccuracies in our velocity model is something we will likely always have to deal with.

The last years sparked a flurry of activity on various flavors of image enhancement through optimized summation of pre-stack migrated images. Most of them stem from the observation that conventional stacking is proficient only when all traces have similar amplitudes and S/N and when the noise patterns are statistically independent of the noise of any other trace and of the signal (Mayne, W. H., 1962, Common reflection point horizontal data stacking techniques: Geophysics, 27, 927-938, doi:10.1190/1.1439118; Neelamani, R., T. A. Dickens, and M. Deffenbaugh, 2006, Stack-and denoise: A new method to stack seismic datasets: 76th Annual International Meeting, SEG, Expanded Abstracts, 2827-2831; Robinson, J. C., 1970, Statistically optimal stacking of seismic data: Geophysics, 35, 436-446, doi:10.1190/1.1440105). The basic idea is to enhance the signal-to-noise ratio by only stacking those volumes that contain consistent and relevant information. Liu et al. (Liu, G., S. Fomel, L. Jin, and X. Chen, 2009, Stacking seismic data using local correlation: Geophysics, 74, no. 3, V43-48.) and Compton et al. (Compton, S., and C., Stork, 3D non-linear stack enhancement: Correlation based stacking: SEG Technical Program Expanded Abstracts 2012: pp. 1-5) propose that weights represent a measure of the local correlation between each input trace and a conventional stacking reference trace. Kun et al. (Kun, J., X. Cheng, D., Sun, and D., Vigh, 2014, Migration imaging enhancement through optimized alignment of vector image partitions. SEG Technical Program Expanded Abstracts 2014: pp. 3699-3703. doi: 10.1190/segam2014-1648.1) apply a template matching technique between pre-stack images and a windowed reference image to find an optimal alignment and the weighting coefficients. These procedures are semi-automatic and the quality of the final stack is to some extent dependent on the quality of the reference trace. Local correlation stacking method can benefit from more advanced techniques to obtain the reference trace (Sanchis, C., and A. Hanssen, 2011, Enhanced local correlation stacking method: Geophysics, 76, no. 3, V33-45.).

FIG. 1 illustrates diagrammatically a survey of seismic data with a source S of seismic waves and at least one receivers G. It also shows a point B of the subsurface which is assumed to contribute to the signal sensed by one of the receivers G. The horizontal coordinates of point B of the subsurface are denoted by x, y (or only one spatial coordinate if 2D imaging instead of 3D imaging is considered), while its depth is denoted by z. FIG. 1 also provides a simplified representation (dashed lines 101 and 102) of the propagation of seismic waves from the source S to the point B and from the point B to the receiver G. The waves are refracted at discontinuities of the geological layers where the acoustic impedance changes, and reflected or diffracted at different positions including that of point B. In FIG. 1, a represents the aperture and m the common mid-point.

The data recorded in a seismic survey include, for each shot from a source S and for each receiver G, a seismic trace which is a time series of the signal sensed by the receiver G. The traces for a number of shots must be transformed to provide an image of the subsurface which will be the result of stacking or integrating a large amount of information. An important step of the transformation is the migration which consists in rearranging the data with respect to a model such that the stacking can be carried out coherently. The model is usually a map of the propagation velocity of the acoustic waves in the subsurface. It is not known a priori and it is a main challenge of all seismic imaging technologies to determine a model that will properly account for the field data after stacking.

In pre-stack depth migration (PSDM) methods, migrated data are computed for each shot using the velocity model and arranged in an output cube containing migrated values associated with positions in the subsurface. The cubes obtained for different shots are then analyzed to check consistency of the model: they can then be used either for obtaining a final image or producing Common Image Gathers. The model may be corrected and the process is iterated until a satisfactory image is obtained.

Common Image Gathers (CIGs) are popular tools for evaluating the migration velocity field and for imaging enhancement. They are made of data extracted from the output cubes, sorted in a convenient way for analysis so as to check the velocity model. A CIG is a bi-dimensional data structure defined for a given horizontal position x, y, with a first axis representing the depth z and a second axis representing a domain parameter A referred to for sorting the data of the output cubes. It contains reflectivity values obtained from the output cubes resulting from the migration, forming an image which can be analyzed to check and/or correct the velocity model. In this image, a pixel value at a point (z, A) represents a migrated value derived as a contribution of the subsurface position x, y, z to a seismic trace associated with the domain parameter A. Examples of commonly used domain parameters A include the aperture a, namely the distance between the center C of the source location and the receiver location G and the orthogonal projection of the point B on the surface.

The computation of common image gathers is not straightforward in all wavefield extrapolation methods.

Migration aperture is a critical parameter in Kirchhoff migration to obtain the best image quality from a given dataset. Optimal aperture selection is the result of a compromise. Reducing the migration aperture generally enhances the signal/noise ratio but to the detriment of dipping events imaging. Unfortunately, wave-equation migration methods have to deviate from this methodology.

However, such tools have been used mostly in migration methods based on estimation of travel times between reflectors and the surface. More sophisticated migration methods have been developed to build PSDM images by solving the wave equation so as to obtain more accurate reflector amplitudes and structural positioning. For example, reverse-time migration (RTM) is a two-way migration solution which can accurately describe wave propagation in complex media. It is increasingly used in seismic exploration by virtue of advances in computer power and programming.

The above-mentioned analysis tools are not used with wave equation PSDM methods, including RTM, because it is not known how to compute aperture indexed CIGs in these methods (mainly, the aperture indexed CIGs may only be computed, for now, in Kirchhoff method).

It would be desirable to obtain aperture indexed CIGs with different kinds of migration methods, in particular wave-equation methods including RTM or one-way migration methods, so as to keep the advantages of wavefield methods and, at the same time, address the limitation of the asymptotic assumption of ray-based methods, while sorting the migrated cubes in the same way as classical surface offset gathers.

SUMMARY OF THE INVENTION

A method of processing seismic data is proposed to provide common image gathers in the surface aperture domain. The method comprises
inputting seismic data including, for each of a plurality of shots at respective source locations, seismic traces recorded at a plurality of receiver locations;
applying a depth migration process to the seismic data to obtain a first set of migrated data including, for each shot, first migrated values respectively associated with a plurality of subsurface positions;
computing mid-point-modulated data by multiplying the seismic data in each seismic trace by a function of the center of the source and receiver locations for said seismic trace;
applying the depth migration process to the mid-point-modulated data to obtain a second set of migrated data including, for each shot, second migrated values respectively associated with the plurality of subsurface positions;
for each shot, estimating aperture values respectively associated with at least some of the subsurface positions, by a division process applied to the first and second sets of migrated data; and
estimating a aperture indexed common image gather at a horizontal position, comprising respective migrated values R(x,y,z,a) for parameter pairs each including a depth parameter and an aperture parameter, The division process may be performed in a Radon domain. The migrated value for a parameter pair in the common image gather at said horizontal position is a first migrated value of the first set of migrated data associated with a subsurface position determined by said horizontal position and the depth parameter of said parameter pair for a shot such that the estimated aperture value associated with said subsurface position is the aperture parameter of said parameter pair.

The surface aperture indexed gathers can be obtained without referring to the traditional Kirchhoff paradigm which is based on an infinite frequency approximation of the wave equation and ray tracing. The method is thus applicable to various kinds of depth migration processes, including wave equation pre-stack depth migration (PSDM) processes.

If a method to determine offset CIGs may be known, this method allows a direct determination of an aperture indexed CIGs without additional computation.

In a preferred embodiment, the depth migration process is a reverse-time migration (RTM) process.

RTM provides a better propagator than ray tracing. Therefore, it allows producing CIGs in complex areas like sub-salt, complex overburden, etc. Furthermore, since the sorting of the output is the same, the conventional Kirchhoff aperture indexed gathers can be replaced by the CIGs obtained by means of the method as input of most of the standard post-processing tools and then be used for optimal stacking. Because of years of know-how in Kirchhoff-type migration, this method allows for an easier interpretation of the migrated results.

For achieving an improved stability, the division process used for estimating the aperture values associated with a subsurface position may comprise minimizing a cost function defined by an aperture variable and local values of the first and second migrated values in a neighborhood of the subsurface position.

Another aspect of the invention relates to a system for processing seismic data, comprising computer resource configured to carry out a method of analyzing seismic data as defined above.

Yet another aspect of the invention relates to a computer program product for a system for processing seismic data, comprising instructions to carry out a method as defined above when said program product is run in a computer processing unit of the system.

Other features and advantages of the method and apparatus disclosed herein will become apparent from the following description of non-limiting embodiments, with reference to the appended drawings.

BRIEF DESCRIPTION THE DRAWINGS

DETAILED DESCRIPTION OF THE DRAWINGS

One way to obtain aperture indexed CIGs for PSDM (e.g. RTM migration methods) would be to compute one migration per shot and per trace, requiring a number of migrations equal to the total number of shots times the average number of receivers per shot. This is clearly impractical for the time being, especially for 3D cases. Instead, it is proposed to use a more feasible solution, namely attribute migration, also called double migration.

In the double migration method as introduced by N. Bleistein ("On the imaging of reflectors in the earth", Geophysics, Vol. 52, No. 7, July 1987, pp. 931-942), two migrations are computed with the same data, the second one involving a migration operator multiplied by the specular reflection angle. The division of the two migrated images then gives the specular angle along the reflectors.

A similar method can be used with the common mid-point (as defined above) instead of the specular reflection angle as the migrated attribute. The migration can be performed using various PSDM methods including standard shot-record RTM.

Figure 3:
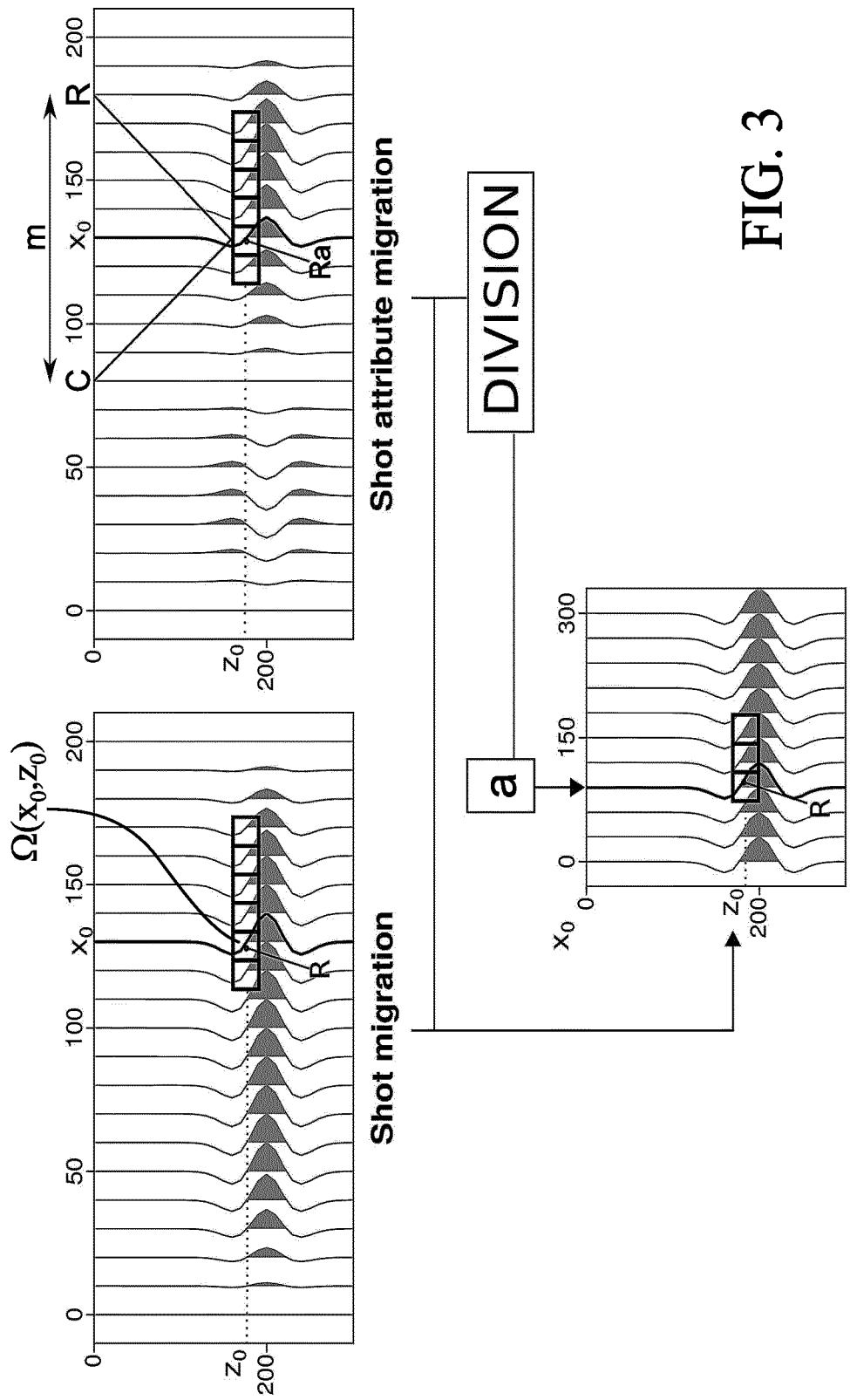
FIG. 3 is a diagram illustrating the derivation of aperture indexed CIGs in accordance with the method.

The methodology then comprises (e.g. for 2D case, 3D we have three images where two images are encoded with CMPx and CMPy respectively):

performing a first standard RTM migration (step 20 in FIG. 3);

performing a second mid-point attribute RTM migration, where the data are multiplied by the common mid-point values (m) prior to migration (steps 30 and 40 in FIG. 3);

perform a division of the two migrated data obtained, in a least square sense, to obtain the common mid-point (step 50 in FIG. 3);

for each point of the image subtract the lateral coordinate of the corresponding location to obtain the aperture migrated attribute;

add the reflectivity obtained from the first migrated data to the corresponding subsurface and aperture indexed gather location given by the obtained attribute map to reconstruct the attribute migrated aperture CIGs (step 60 in FIG. 3).

In this way we are able to obtain classical aperture indexed CIGs using a PDSM migration method such as RTM which is the best wavefield extrapolation method available nowadays for seismic migration.

Figure 2:
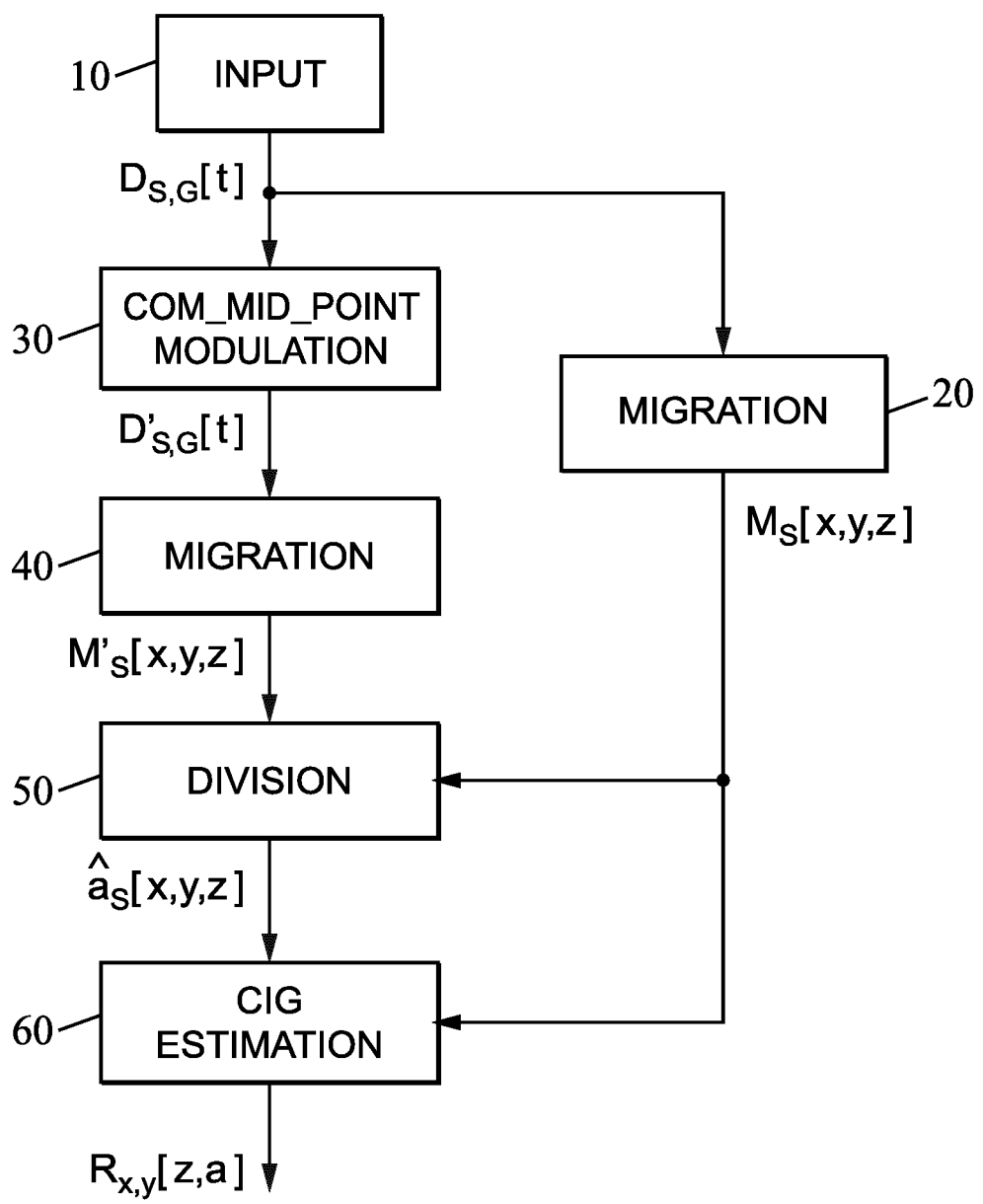
FIG. 2 is a flowchart of a method of processing seismic data in accordance with an embodiment of the invention.

In FIG. 2, the seismic traces input in step 10 from the field measurements are noted $D_{S,G}[t]$, where S denotes a source location, G denotes a receiver location and t is for time. Each trace is modulated in step 30 by multiplying it by the corresponding mid-point value, namely the horizontal mid-point distance between the center of the segment defined by the source location S and the receiver location G and the receiver location G or the source location S. The mid-point-modulated traces are $D'_{S,G}[t]=m \cdot D_{S,G}[t]$.

The seismic data $D_{S,G}[t]$ and mid-point-modulated data $D'_{S,G}[t]$ are respectively migrated in steps 20 and 40 to provide PSDM data/image $M_S[x,y,z]$ and $M'_S[x,y,z]$. The first set of migrated data produced in step 20 includes, for each shot at a source location S, a cube of migrated values $M_S[x,y,z]$ associated with subsurface positions x, y, z. Likewise, the second set of migrated data obtained in step 40 using the same depth migration process includes another cube of migrated values $M'_S[x,y,z]$ for each shot.

Before accessing to the aperture value, it is mandatory to apply a subtraction process comprising the projection of said lateral distance between the said image position and the common mid-point location.

In order to estimate an aperture value $â_S[x, y, z]$ for a migrated value $M_S[x,y,z]$, i.e. a value for a shot S and a subsurface position x, y, z, a division process is performed in step 50 to evaluate $M'_S[x,y,z]/M_S[x,y,z]$.

A raw division of the two numbers may give rise to stability issues but is possible. Instead, it may be better to cast the division as a set of local least square problems. The aperture value $â_S[x, y, z]$ is then found by minimizing a cost function $J_{S,x,y,z}(a)$ defined in a neighborhood $\Omega(x,y,z)$ centered on the location x, y, z. A possible expression of the cost function $J_{S,x,y,z}(a)$ is:

$$J_{S,x,y,z}(a) = \frac{1}{2}\int_{(u,v,w)\in\Omega(x,y,z)} |M_S^a[u, v, w] \cdot a - M'^a_S[u, v, w]|^2 du \cdot dv \cdot dw \quad (1)$$

where $M_S^a[x, y, z]=M_S[x,y,z]+i \cdot H(M_S[x,y,z])$ is the analytic signal of the reflectivity, H denoting the Hilbert transform, and $M'^a_S[x, y, z]=M'_S[x,y,z]+i \cdot H(M'_S[x,y,z])$. The size of the neighborhood $\Omega(x,y,z)$ is variable and can depend on the application. It is selected such that the value of the migrated attribute a can reasonably be assumed to be constant over $\Omega(x,y,z)$ for a given shot.

The aperture values $â_S[x, y, z]$ may then be contained as:

$$â_S[x, y, z] = \underset{a}{\mathrm{Argmin}}(J_{S,x,y,z}(h)) = \frac{\int_{\Omega(x,y,z)} M'^a_S[u, v, w] \cdot (M_S^a[u, v, w])^* du \cdot dv \cdot dw}{\int_{\Omega(x,y,z)} M_S^a[u, v, w] \cdot (M_S^a[u, v, w])^* du \cdot dv \cdot dw} \quad (2)$$

where the superscript (.)* denotes the Hermitian. Note that the upper part of the right-hand side of equation (2) is the cross-correlation of the two images, the standard migrated image and the attribute-migrated image. The lower part is the auto-correlation of the standard migrated image, or the envelope. In this way, the stability of the division is increased.

The aperture values $â_S[x, y, z]$ thus obtained are used to map the reflectivity values $M_S[x,y,z]$ to corresponding apertures a, which reflectivity values can then arranged as surface aperture indexed CIGs at the horizontal positions x, y:

$$R_{x,y}[z, a] = \int_S M_S[x, y, z] \cdot \delta(a - â_S[x, y, z]) \quad (3)$$

Figure 1:
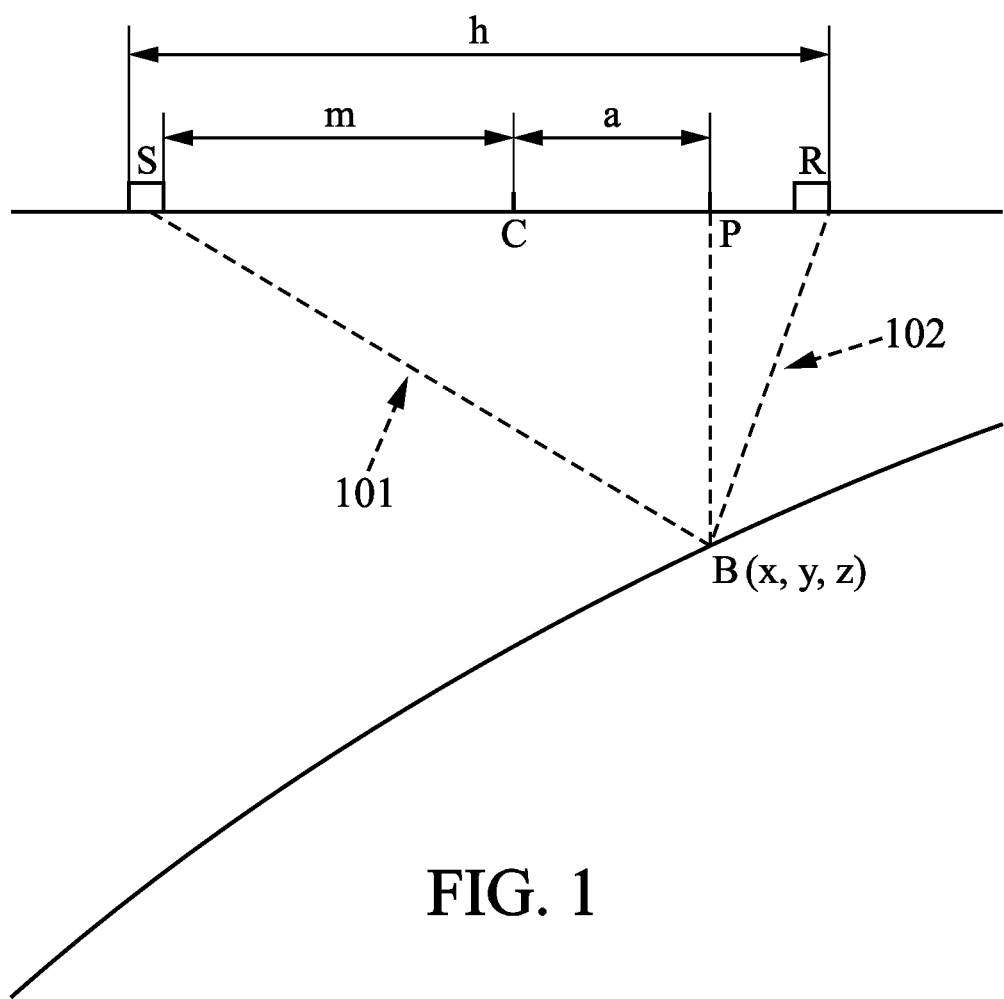
FIG. 1 is a schematic diagram illustrating the acquisition of seismic data.

This process of computing the surface aperture indexed CIGs is illustrated in the diagram of FIG. 3. The aperture attribute is obtained by the 'double migrated' map division. The two upper panels of the diagram depict two common shot migrated images showing a horizontal reflector. The first image is obtained by means of Reverse Time migration of plain seismic data, while the second is the output of migration where the data have been multiplied by the common mid-point distance m. In this panel, amplitudes vary laterally along the reflector and are proportional to the receiver position and, therefore, to the aperture. In particular, starting from the left side, the amplitude is negative, it reaches zero exactly below the point C as defined in FIG. 1 and becomes positive afterwards.

For a specific position $(x_0, z_0)$ in the shot migrated image (here, the horizontal position $x_0$ may be 2D, with x and y components), we have a particular value of reflectivity R. At the same position in the attribute-migrated image, the value of the reflectivity is R multiplied by the common mid-point m. The aperture is function of the division of the two quantities. With these four values $(x_0, z_0, a, R)$, we can now build the migrated aperture cube. The lower panel the diagram of FIG. 3 represents a common-midpoint section at the location $x_0$. The contribution of the reflectivity R is added to the position whose coordinates are given by the couple depth/aperture $(z_0, a)$.

The proposed method to obtain classical surface gathers for various PSDM techniques including Reverse Time migration showed to be successfully applicable in the context of band-limited propagation. The proposed methods do not depend on a particular implementation of wave-field extrapolation method, since it can be performed after shot-record migration in Fourier domain, time domain, etc.

An advantage of this method is that it allows the use of better propagators than rays to propagate the wave-field, making it possible to adopt the full arsenal of standard tools for post-processing developed for asymptotic migration schemes. Compared to Subsurface-Offset and Scattering Angle Subsurface-Offset, Aperture CIGs for RTM are way less expensive to compute, and they preserve the kinematic move-out.

The embodiments of the method described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc.

Typically, the method is carried out using software modules which may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

It will be appreciated that the embodiments described above are illustrative of the invention disclosed herein and that various modifications can be made without departing from the scope as defined in the appended claims.

The invention claimed is:

1. A method of processing seismic data, comprising:
inputting a seismic data including, for each of a plurality of shots at respective source locations, a plurality of seismic traces recorded at a plurality of receiver locations;
applying a depth migration process to the seismic data to obtain a first set of migrated data including, for each shot, a first migrated value respectively associated with a plurality of subsurface positions;
computing a mid-point-modulated data by multiplying the seismic data in each seismic trace by a function of a center of the source and receiver locations for said seismic trace;
applying the depth migration process to the mid-point-modulated data to obtain a second set of migrated data including, for each shot, a second migrated values respectively associated with the plurality of subsurface positions;
applying a subtraction process comprising a projection of a lateral distance between an image position and a common mid-point location;
for each shot, estimating an aperture value respectively associated with at least some of the subsurface positions, by a division process performed in a Radon domain applied to the first and second sets of migrated data; and
estimating an aperture indexed common image gather at a horizontal position, comprising respective migrated values for a parameter pair, each including a depth parameter and an aperture parameter,
wherein the migrated value for the parameter pair in the common image gather at said horizontal position is a first migrated value of the first set of migrated data associated with a subsurface position determined by said horizontal position and the depth parameter of said parameter pair for a shot such that the estimated aperture value associated with said subsurface position is the aperture parameter of said parameter pair.

2. The method as claimed in claim 1, wherein the division process used for estimating the aperture values associated with a subsurface position comprises minimizing a cost function defined by an aperture variable and local values of the first and second migrated values in a neighborhood of said subsurface position.

3. The method as claimed in claim 1, wherein the depth migration process is a reverse-time migration process.

4. The method as claimed in claim 1, wherein the depth migration process is a wave equation pre-stack depth migration process.

5. A system for processing seismic data, comprising computer resource configured to carry out a method as claimed in claim 1.

6. A computer program product for a system for processing seismic data, comprising instructions to carry out a method as claimed in claim 1 when said program product is run in a computer processing unit of the system for processing seismic data.

* * * * *